Nov. 14, 1961    J. S. MARTINEZ    3,008,809
APPARATUS FOR SLURRYING SOLIDS IN LIQUID
Filed Feb. 26, 1959
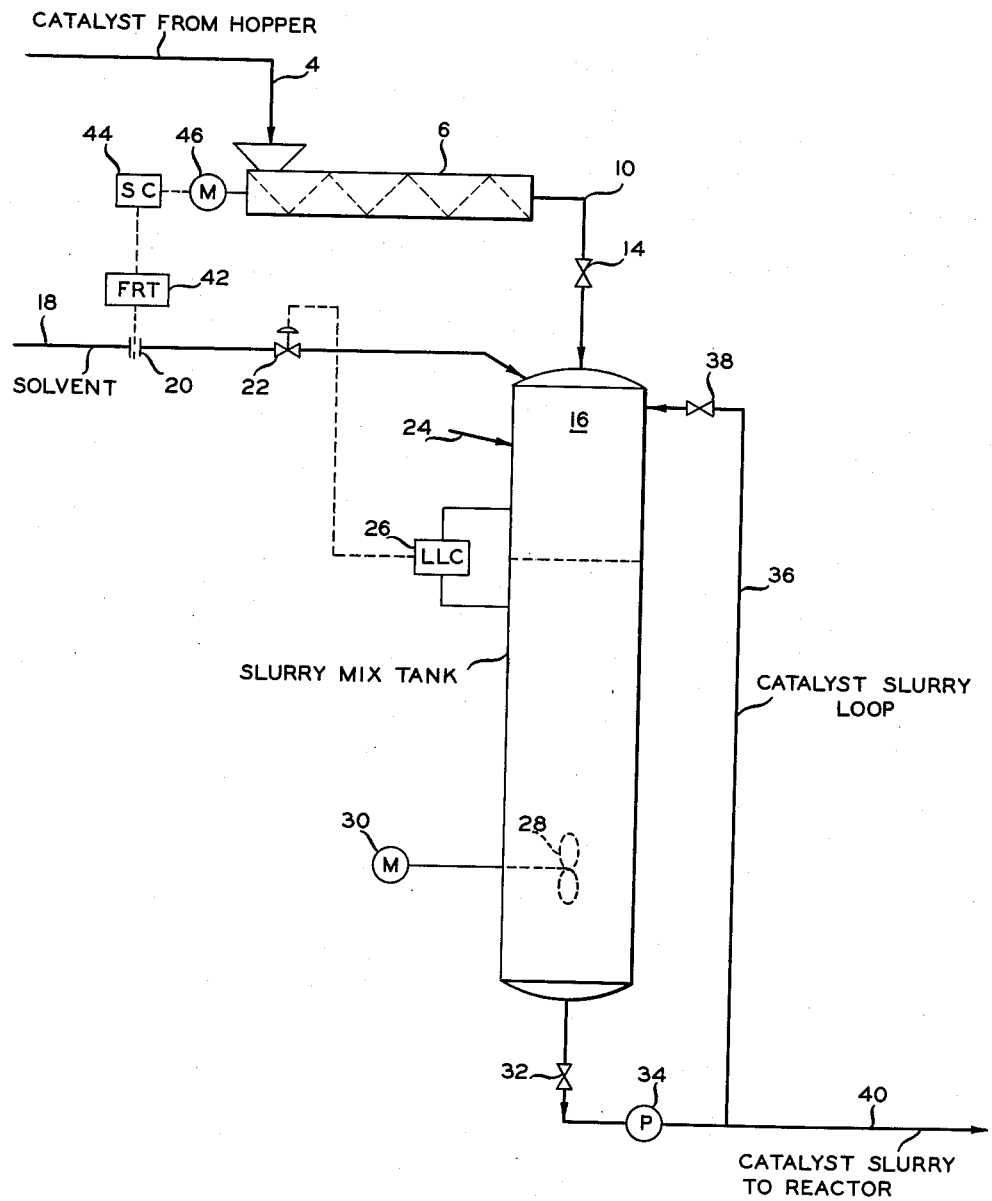
INVENTOR.
J. S. MARTINEZ
BY
*Hudson and Young*
ATTORNEYS ID
3,008,809
APPARATUS FOR SLURRYING SOLIDS
IN LIQUID
Jesus S. Martinez, Pasadena, Tex., assignor to Phillips
Petroleum Company, a corporation of Delaware
Filed Feb. 26, 1959, Ser. No. 795,679
6 Claims. (Cl. 23—285)

This invention relates to apparatus for forming a slurry of subdivided solids in a liquid. In one aspect it relates to apparatus for forming a slurry of solid catalyst in a liquid for introduction to a reaction zone. In another aspect the invention relates to apparatus for forming a slurry of a solid catalyst which is poisoned by water, in a liquid in controlled proportions.

It is an object of this invention to provide improved apparatus for slurrying solids in a liquid.

Another object of the invention is to provide apparatus for controlling the composition and feed rate to a reaction zone of a slurry of subdivided solid catalyst in a liquid.

These and other objects of the invention will become more readily apparent from the following description and discussion.

In carrying out the invention the above objects are achieved broadly by introducing catalyst to a slurry mix vessel through a variable speed screw feeder, introducing liquid in which the solids are to be slurried to the same vessel, varying the rate of flow of said liquid into said vessel in inverse proportion to and in response to variations in the slurry level in said vessel and varying the speed of said screw feeder in direct proportion to and in response to variations in the rate of flow of said liquid.

In one aspect of the invention the subdivided solids which are to be slurried are catalyst solids which are poisoned by water. In this aspect of the invention the solids are introduced to a slurry mix vessel from which air is excluded by maintaining therein an inert gas atmosphere.

In another aspect of the invention means are provided for continuously withdrawing slurry from the slurry mix vessel and returning slurry to said vessel to provide a continuous stream of circulating slurry and means is provided for continuously withdrawing slurry from the circulating stream.

The invention will be described in conjunction with the accompanying drawing which is a diagrammatic illustration of apparatus and instrumentation suitable for carrying out the invention. Referring to the drawing a positive displacement variable speed screw feeder 6 is provided for feeding actalyst to slurry mix tank 16 through conduit 10 and valve 14, respectively. Solvent is also introduced to slurry mix tank 16 through conduit 18, an orifice 20, and control valve 22. The slurry mix tank is provided with a liquid level controller 26, which communicates with and resets control valve 22. A mixer 28 driven by motor 30 is provided in the slurry mix tank for maintaining agitation and circulation of slurry therein. Slurry outlet valve 32 is provided in the bottom of the slurry mix tank, communicating with pump 34 and conduits 36 and 40 through which slurry is removed from the system. Conduit 36 also acts as a slurry circulating line, slurry being returned through this conduit and valve 38 to the slurry mix tank. A variable speed motor 46 is provided as the driver for screw feeder 6. A speed controller 44 is provided in combination with the motor, said speed controllers being actuated by flow recorder transmitter 42 which communicates with orifice 20 in the solvent feed line 18.

In the operation of the apparatus of the drawing finely subdivided solids, such as for example chromium oxide catalyst, containing hexavalent chromium, and supported on silica-alumina are introduced through conduit 4 to a hopper, from which they pass into screw feeder 6. The catalyst is propelled by the screw feeder, passes through conduit 10 and valve 14, entering slurry mix tank 16. A liquid material, such as cyclohexane solvent, is introduced to the system through conduit 18 passing through orifice 20, and control valve 22 before entering the slurry mix tank. The liquid and solids entering the slurry mix tank become agitated and finely intermixed through the action of stirrer 28, whereby a uniform slurry is formed. A level of slurry is provided in the slurry mix tank by liquid level controller 26 which resets control valve 22 to provide control of the cyclohexane feed rate to said tank. Withdrawal of slurry from the slurry mix tank is provided through valve 32 and pump 34, with slurry being removed from the system through conduits 36 and 40. A portion of the slurry is recirculated to the slurry mix tank through conduit 36 and valve 38. Solvent flowing through orifice 20, which can be an orifice such as a Builders-Providence Flow Orifice (Builders-Providence Bulletin 309A) produces a pressure differential which is proportional to the solvent flow rate. This differential actuates a transmitter 42, such as a Foxboro Electric DP Cell (Foxboro Bulletin 450, page 23) which produces an electrical signal proportional to flow, which is fed to a motor speed control 44, such as a GE "Thy-Mo-Trol" controller (General Electric Apparatus Handbook, Book 1, Sheet 1125, pages 11–16, Feb. 5, 1951). Controller 44 in turn controls the speed of drive motor 46 which operates the positive displacement screw feeder 6. As long as the solvent flow rate through conduit 18 remains constant the speed of motor 46 does not vary and a constant amount of catalyst is introduced to the slurry mix tank. However, if the solvent rate should for example increase, the described control system provides a proportional increase in the rate of catalyst fed to the mix tank. Conversely a decrease in solvent flow rate produces a proportional decrease in the quantity of catalyst introduced to the mix tank. By the use of this system it is possible to provide a slurry in the slurry mix tank having a substantially constant solids content at all times. The described system is capable of providing variable amounts of catalyst slurry within the capacity of the screw feeder and solvent conduit 18. Thus, catalyst slurry can be withdrawn at a uniform rate or at a variable rate from conduit 40 for such use as desired. Any changes in the catalyst slurry withdrawal rate are quickly reflected in the level of slurry in the mix tank, and changes in said level are quickly compensated for by appropriate changes in the flow rate of solvent and catalyst introduced to said tank.

The apparatus of this invention is applicable to the treatment of solids in general, such as for example, inert materials like sand, carborundum, pumice, etc., materials suitable for conversion to reaction products like coal, shale, lignite, etc. and catalytic materials like metals, metal oxides, for example, silica, alumina, silica-alumina, etc. The solids are subdivided to provide materials which are readily maintained in the form of a slurry, the degree of subdivision required depending on the particular solid or solids in the slurrying liquid employed. More usually the solids range in size from between about 1 to about 200 microns, and preferably between about 10 and about 150 microns. The quantity of solids which can be retained in the slurry is readily determined and is also dependent on the type of solids employed, the liquid used and the liquid velocity, etc. It is possible to form and maintain slurries having a solids content as high as 0.5 to 1 pound of solid per pound of liquid.

Although any of the solids previously given are suitable for treatment in the apparatus of this invention the invention is particularly applicable in the handling of catalytic materials and in its preferred embodiment is directed to the slurrying of catalysts which are employed in the polymerization of olefinic materials to solid polymers thereof. One method of preparing polymers of olefins wherein the catalyst slurry prepared in the apparatus of this invention can be employed is described in detail in Hogan et al. Patent No. 2,825,721. In the polymerization method of this patent a chromium oxide catalyst preferably containing hexavalent chromium associated with silica, alumina, silica-alumina, zirconia, thoria, etc. is employed. In the method of Hogan et al. olefins are polymerized in the presence of a hydrocarbon diluent, for example, an acyclic, alicyclic or aromatic compound which is inert and in which the formed polymer is soluble. The reaction is ordinarily carried out at a temperature between about 150 and about 450° F. under a pressure sufficient to maintain the reactant and diluent in a liquid state. In one embodiment of this patent polymers are prepared by utilizing a mobile catalyst which is introduced to the reaction system slurried in a liquid solvent.

The handling of catalyst used for the polymerization of olefins poses a problem which is not present in the treatment of materials like sand, carborundum, shale and many other catalytic materials. It has been found that the polymerization catalysts are poisoned by certain materials among which is water, such as for example by the moisture in the air. Therefore, in handling materials of this type it is necessary that steps be taken to prevent contact of the catalyst or other sources of water. In the method of this invention moisture and air are excluded from the slurry mix tank 16 by introducing an inert gas above the slurry-liquid level through conduit 24. Any suitable gasiform material such as nitrogen, flue gas, etc. can be employed. If the catalysts are subsequently to be used in the polymerization of an olefin such as, for example, ethylene, a portion of said olefin can be employed to exclude air and moisture from the slurry mix tank. Operation in this manner can eliminate a subsequent treating step which may otherwise be necessary to remove inert gas which is dissolved and/or entrained in the slurrying liquid.

The preceding discussion has been directed to an embodiment of the invention which utilizes a specific instrumentation arrangement. This is not intended, however, to limit the scope of the invention and other instrument arrangements which provide the control functions of this invention are also used. The liquid level controller on the slurry mix tank, the control valve in the solvent conduit to the slurry mix tank, mixer 28 and motor 30 are all conventional apparatus and are well known to the art.

The following example is given in illustration of a typical application of the invention.

*Example*

Cyclohexane at a rate of about 20,000 lb./hr. is introduced through conduit 18, orifice 20 and valve 22 to slurry mix tank 16. At the same time chromium oxide-silica-alumina polymerization catalyst subdivided to a size range of about 1 to about 200 microns is introduced to the slurry mix tank at a rate of about 2000 lb./hr. from variable speed screw feeder 6 through conduit 10 and valve 14. The cyclohexane and catalyst are agitated in the slurry mix tank with mixer 28 to provide a substantially uniform solids-liquid slurry. Circulation of slurry in the catalyst loop defined by conduit 36 and valves 32 and 38 is maintained by a centrifugal pump. Slurry is withdrawn from the loop for use in a polymerization reactor through conduit 40. With the system operating at equilibrium the amount of catalyst slurry so withdrawn is equal in quantity to the slurry formed by the admixture of solvent and catalyst in the slurry mix tank. An instrumentation system which is the same as that previously described in conjunction with the drawing is provided for the purpose of controlling the system.

During the course of the polymerization reaction the catalyst becomes partially deactivated and it becomes necessary to increase the feed rate of fresh catalyst. This is provided by increasing the rate of withdrawal of slurry from the slurry loop to provide a catalyst feed rate of about 2100 lb./hr. The immediate result of the increase in slurry rate is a drop in level in the slurry mix tank 16. The change in slurry level actuates liquid level control valve 26 which transmits a signal resetting control valve 22 whereby the amount of solvent flow through conduit 18 is increased to about 21,525 lb./hr. The increased solvent flow rate through orifice 20 is in turn transmitted to flow recorder transmitter 42 and speed controller 44 which increases the speed of rotation of motor 46 and screw feeder 6 to provide a sufficient increase in the catalyst rate to the slurry mix tank to maintain the 10:1 ratio of solvent-to-solids in the slurry contained therein.

Having thus described the invention by providing a specific example thereof it is to be understood that no undue limitations or restrictions are to be drawn by reason thereof and that many variations and modifications are within the scope of the invention.

I claim:

1. Apparatus for slurrying subdivided solids in a liquid which comprises a vessel adapted to hold a solids-liquid slurry, conduit means for introducing liquid to said vessel, means for varying the flow rate of liquid through said conduit means in inverse proportion to and in response to variations in the volume of slurry contained in said vessel, variable speed screw feeder means for introducing solids to said vessel, means for varying the speed of said screw feeder means in direct proportion to and in response to variations in the flow of liquid through said conduit means, means for agitating the contents of said vessel and means for withdrawing solids-liquid slurry from said vessel.

2. Apparatus for slurrying subdivided solids in a liquid which comprises a vessel adapted to hold a solids-liquid slurry, conduit means for introducing liquid to said vessel, means for varying the flow rate of liquid through said conduit means in inverse proportion to and in response to variations in the volume of slurry contained in said vessel, variable speed screw feeder means for introducing solids to said vessel, means for varying the speed of said screw feeder means in direct proportion to and in response to variations in the flow of liquid through said conduit means, means for agitating the contents of said vessel, means for withdrawing solids-liquid slurry from said vessel and returning said slurry to said vessel to provide a continuous circulating stream of said slurry, and means for withdrawing slurry from said continuous circulating stream.

3. Apparatus for slurrying subdivided solids in a liquid which comprises a vessel adapted to hold a solids-liquid slurry, conduit means for introducing liquid to said vessel, means for maintaining a slurry level in said vessel, valve means in said conduit means, means for varying the flow rate of liquid through said valve means in inverse proportion to and in response to variations in the slurry level in said vessel, variable speed screw feeder means for introducing solids to said vessel, means for varying the speed of said screw feeder means in direct proportion to and in response to variations in the flow of liquid through said conduit means, means for agitating the contents of said vessel and conduit means for withdrawing solids slurry from said vessel.

4. Apparatus for slurrying subdivided solids in a liquid which comprises a vessel adapted to hold a solids-liquid slurry, conduit means for introducing liquid to said vessel, means for maintaining a slurry level in said vessel, valve means in said conduit means, means for varying the flow rate of liquid through said valve means in inverse proportion to and in response to variations in the slurry level in said vessel, variable speed screw feeder means for introducing solids to said vessel, means for varying the speed of said screw feeder means in direct proportion to and in response to variations in the flow of liquid through said conduit means, means for agitating the contents of said vessel, means for withdrawing slurry from said vessel and returning slurry to said vessel to provide a continuous circulating stream of said slurry and means for withdrawing slurry from said continuous circulating stream.

5. Apparatus for slurrying subdivided solids and liquid which comprises a vessel adapted to hold a solids-liquid slurry, conduit means containing an orifice and a valve for introducing liquid to said vessel, a liquid level controller for varying the flow rate of liquid through said valve in inverse proportion to and in response to variations in the slurry level in said vessel, variable speed positive displacement screw feeder means for introducing solids to said vessel, a motor for driving said screw feeder means, means for varying the speed of said motor in direct proportion to and in response to variations of flow of liquid through said orifice, means for agitating the contents of said vessel and conduit means for withdrawing solids-liquid slurry from said vessel.

6. Apparatus for slurrying subdivided polymerization catalyst solids in a solvent polymer solvent which comprises a vessel adapted a hold a solids-liquid slurry, conduit means containing an orifice for introducing liquid to said vessel, a liquid level controller for maintaining a slurry level in said vessel, valve means in said conduit means communicating with said liquid level controller adapted to vary the flow rate of liquid through said valve means in inverse proportion to and in response to variations in the slurry level in said vessel, variable speed positive displacement screw feeder means for introducing solids to said vessel, a motor for driving said screw feeder means, a flow transmitter means for varying the speed of said motor in direct proportion to and in response to variations in the flow rate of liquid solvent through said orifice, means for agitating the contents of said vessel, means for withdrawing slurry from said vessel and returning slurry to said vessel to provide a continuous circulating stream of slurry and means for withdrawing slurry from said continuous circulating stream.

References Cited in the file of this patent

UNITED STATES PATENTS

| | | |
|---|---|---|
| 2,486,650 | Hepp et al. | Nov. 1, 1949 |
| 2,513,562 | Holuba | July 4, 1950 |
| 2,701,210 | Fisher et al. | Feb. 1, 1955 |